United States Patent
Kumar et al.

(10) Patent No.: US 12,395,094 B2
(45) Date of Patent: Aug. 19, 2025

(54) MULTI-RATIO SWITCHED CAPACITOR CONVERTER AND METHOD OF OPERATION THEREOF

(71) Applicant: SILICONCH SYSTEMS PVT LTD, Karnataka (IN)

(72) Inventors: Kaustubh Kumar, Uttar Pradesh (IN); Burle Naga Satyanarayana, Andhra Pradesh (IN); Rakesh Kumar Polasa, Karnataka (IN); Satish Anand Verkila, Karnataka (IN)

(73) Assignee: Siliconch Systems Pvt Ltd, Karnataka (IN)

( * ) Notice: Subject to any disclaimer, the term of this patent is extended or adjusted under 35 U.S.C. 154(b) by 258 days.

(21) Appl. No.: 18/137,762

(22) Filed: Apr. 21, 2023

(65) Prior Publication Data
US 2023/0344365 A1   Oct. 26, 2023

(30) Foreign Application Priority Data

Apr. 25, 2022   (IN) .............................. 202241024322

(51) Int. Cl.
*H02M 7/483* (2007.01)
*H02J 7/00* (2006.01)
*H02M 3/07* (2006.01)

(52) U.S. Cl.
CPC ........... *H02M 7/4837* (2021.05); *H02J 7/007* (2013.01); *H02M 3/07* (2013.01); *H02J 2207/20* (2020.01)

(58) Field of Classification Search
CPC ..................... H02M 3/07–078; H02M 7/4837
See application file for complete search history.

(56) References Cited

U.S. PATENT DOCUMENTS

| | | | | |
|---|---|---|---|---|
| 10,651,731 | B1* | 5/2020 | Rainer | H02M 3/1588 |
| 11,290,027 | B1* | 3/2022 | Han | H02J 7/02 |
| 11,522,466 | B1* | 12/2022 | Li | H02M 7/4837 |
| 11,532,987 | B2* | 12/2022 | Han | H02M 1/0058 |
| 11,621,638 | B1* | 4/2023 | Zhang | H02M 3/07 |
| | | | | 323/271 |

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — Sisay G Tiku
(74) *Attorney, Agent, or Firm* — Procopio, Cory, Hargreaves & Savitch LLP

(57) ABSTRACT

The present disclosure provides for a multi-ratio switched capacitor power converter. The converter may include one or more power switching networks supporting a plurality of power conversion modes and characterised in that: an input terminal connected to an input power source and an associated input capacitance, an output terminal connected to a load and an associated output capacitance to obtain a desired output voltage or output load current regulation; and a switching network with one or more arrangements of switches. The one or more arrangements can be of at least twelve, ten or nine switches to provide for a multi ratio, multi mode power conversion system that addresses the problems faced by existing power converters.

15 Claims, 4 Drawing Sheets

(56) References Cited

U.S. PATENT DOCUMENTS

| | | | |
|---|---|---|---|
| 11,742,756 B2* | 8/2023 | Kumar | H02M 3/07 |
| | | | 323/282 |
| 11,777,396 B2* | 10/2023 | Liu | H02M 3/1582 |
| | | | 363/13 |
| 2022/0376603 A1* | 11/2022 | Liu | H02M 1/0095 |
| 2023/0134427 A1* | 5/2023 | Liu | H02M 1/0043 |
| | | | 323/271 |
| 2023/0353036 A1* | 11/2023 | Rizzolatti | H02M 7/4833 |
| 2024/0275279 A1* | 8/2024 | Liu | H02M 3/07 |

OTHER PUBLICATIONS

Universal Serial Bus Power Delivery Specification, Revision 3.0, Version 2.0, Aug. 29, 2019 (657 pages).

\* cited by examiner

MULTI-RATIO SWITCHED CAPACITOR CONVERTER AND METHOD OF OPERATION THEREOF

CROSS REFERENCE TO RELATED APPLICATION(S)

This application claims the benefit of and priority to India Application Serial No. 202241024322, entitled "A MULTI-RATIO SWITCHED CAPACITOR CONVERTER AND METHOD OF OPERATION THEREOF" and filed on Apr. 25, 2022, which is expressly incorporated by reference herein in its entirety.

TECHNICAL FIELD

The present disclosure relates to multi-ratio switched capacitor converters. More particularly, it relates to a converter that addresses the problems faced by inductor-based and inductor-less power converters while supporting higher input voltages, high power levels charging and charging the battery at higher charging currents.

BACKGROUND

Background description includes information that can be useful in understanding the present invention. It is not an admission that any of the information provided herein is prior art or relevant to the presently claimed invention, or that any publication specifically or implicitly referenced is prior art.

Typical USB port based (Type-A or Type-C) devices or portable devices, like mobiles, notebooks tablets, and power banks have inductorless 2:1 switched capacitor converters along with traditional inductor-based power converters. The 2:1 switched capacitor converter's output current is double the input current and output voltage is half of the input voltage. The 2:1 switched capacitor converter works with very limited input voltage i.e. double the output voltage (battery) it cannot work with any other voltage range. The latest battery chemistry technologies allow the batteries to be charged with higher currents. The typical USB Type-C cable (without E-marker) can carry only a current of 3 A. that means battery can charge only 6 A of current. The existing 2:1 switched capacitor converter as shown in FIG. 4 works only with limited input voltage and current ranges, which means limited power.

Therefore, there is a need in the art to provide a reliable and efficient that addresses the problems faced by existing power converters, by providing a system that supports higher input voltages, high power levels charging and charging the battery at higher charging currents.

OBJECTS OF THE PRESENT DISCLOSURE

It is an object of the present invention to provide for a power conversion system to obtain a desired output voltage or output load current regulation.

It is an object of the present invention to provide for a power conversion system having MOSFETS switches and associated components connections or configuration and mode of operation.

It is an object of the present invention to provide for a power conversion system that supports different modes of operations.

It is an object of the present invention to provide for a power conversion system that can support a load with a single or multi cell battery.

SUMMARY

The present disclosure relates to a power converter, and, in particular embodiments of power convertor.

Various objects, features, aspects, and advantages of the inventive subject matter will become more apparent from the following detailed description of preferred embodiments, along with the accompanying drawing figures in which like numerals represent like components.

In an aspect, the present disclosure provides a multi-ratio switched capacitor power converter of a first topology. The converter may include an input power source, a load, and a switching network. In an embodiment, the switching network may further include an input terminal connected to the input power source and an associated input capacitance, an output terminal connected to the load and an associated output capacitance to obtain a desired output voltage or output load current regulation; and at least twelve switches, one or more inductors and one or more flying capacitors. The at least twelve switches may be arranged in such a way that a first switch, a second switch, a third switch, and a fourth switch may be connected in series between the input terminal and a ground, and the series connection of the first switch, the second switch, the third switch, and the fourth switch may be connected in parallel with a series connection with a fifth switch, a sixth switch, a seventh switch, and an eighth switch and the series connection with the fifth switch, the sixth switch, the seventh switch, and the eighth switch may be connected in series between the input terminal and the ground. Additionally, a ninth switch may be configured in the switching network such that a first terminal of the ninth switch is connected to a shared node of a first capacitor and a second terminal of a tenth switch, and a second terminal of the ninth switch is connected to the ground. A second terminal of the tenth switch may be connected to a shared node of the load and the output capacitance and second and third switch shared node, the first switch and the second switch and fifth switch may be connected to a sixth switch. Further, the first capacitor may be connected to a shared node of a second terminal of an eleventh switch and a first terminal of a twelfth switch, and a first terminal of the eleventh switch may be connected to a shared node between the first switch and the second switch and wherein the second terminal of the twelfth switch may be connected to a shared node of the fifth switch and the sixth switch. Furthermore, one or more arrangements of switching ON and OFF of the at least twelve switches between the input terminal and the output terminal causes one or more modes of power conversion configured based on a predetermined input voltage range, wherein the one or more modes of power conversion comprises a multi-ratio switched capacitor mode, and a 1:1 direct mode.

In an aspect, the at least twelve switches are MOSFETs.

In an aspect, a first arrangement of the one or more arrangements of switching ON and OFF of the at least twelve switches between the input terminal and the output terminal to facilitate a 4:1 switched capacitor mode may further include a first phase of operation, wherein the first switch, the third switch, the sixth switch, and the eighth switch are ON, and the remaining switches are in OFF; a second phase of operation, wherein the fourth switch, the tenth switch, the eleventh switch, the sixth switch, and the eighth switch are ON and the remaining switches are OFF;

and a third phase of operation, wherein the first switch, the third switch, the seventh switch, the ninth switch, and the twelfth switch are ON and the remaining switches are OFF.

In an aspect, a second arrangement of the one or more arrangements of switching ON and OFF of the at least twelve switches between the input terminal and the output terminal to facilitate a 3:1 switched capacitor mode may include a first phase of operation, wherein the first switch, the third switch, the eighth switch, the tenth switch, and the twelfth switch are ON, and the remaining switches are OFF; a second phase of operation, wherein the first switch, the third switch, the sixth switch, the ninth switch, and the twelfth switch are ON and the remaining switches are OFF; and a third phase of operation, wherein the fourth switch, the tenth switch, the eleventh switch, and the fifth switch are ON and the remaining switches are OFF.

In an aspect, a third arrangement of the one or more arrangements of switching ON and OFF of the at least twelve switches between the input terminal and the output terminal to facilitate a 2:1 switched capacitor mode may include a first phase of operation, wherein the first switch, the third switch, the sixth switch, and the eighth switch are ON, and the remaining switches are in OFF; and a second phase of operation, wherein the second switch, the fourth switch, the fifth switch, and the seventh switch are ON and the remaining switches are OFF.

In an aspect, a fourth arrangement of the one or more arrangements of switching ON and OFF of the at least twelve switches between the input terminal and the output terminal to facilitate a 1:1 direct mode may include the first switch, the second switch, the fifth switch, and the sixth switch being ON and the remaining switches being OFF.

In an aspect, the present disclosure provides a multi-ratio switched capacitor power converter of a second topology. The converter may include an input power source, a load and a switching network. The switching network may further include an input terminal connected to the input power source and an associated input capacitance, an output terminal connected to the load and an associated output capacitance to obtain a desired output voltage or output load current regulation; and at least ten switches, and one or more flying capacitors. The at least ten switches may be arranged in such a way such that a first switch, a second switch, a third switch, and a fourth switch of the at least ten switches, may be connected in series between the input terminal and a ground, wherein the series connection of the first switch, the second switch, the third switch, and the fourth switch of the at least ten switches may be connected in parallel with a series connection with a fifth switch, a sixth switch, a seventh switch, and an eighth switch of the at least ten switches, and the series connection with the fifth switch, the sixth switch, the seventh switch, and the eighth switch may be connected in series between the input terminal and the ground. Additionally, a ninth switch configured in the switching network such that a first terminal of the ninth switch is connected to a shared node of the first and the second switch, wherein a second terminal is connected to a first terminal of a tenth switch, wherein a second terminal of the tenth switch is connected to a shared node of the fifth switch and the sixth switch. Further, one or more arrangements of switching ON and OFF of the at least ten switches between the input terminal and the output terminal causes one or more modes of power conversion configured based on a predetermined input voltage range, wherein the one or more modes of power conversion comprises a multi-ratio switched capacitor mode, and a 1:1 Direct mode.

In an aspect, the at least ten switches may be MOSFETs.

In an aspect, a first arrangement of the one or more arrangements of switching ON and OFF of the at least ten switches between the input terminal and the output terminal to facilitate a 3:1 switched capacitor mode may include a first phase of operation, wherein the first switch, the third switch, the sixth switch, and the eighth switch are ON, and the remaining switches are in OFF; and a second phase of operation, wherein the fourth switch, the ninth switch, the seventh switch, and the tenth switch are ON and the remaining switches are OFF.

In an aspect, a second arrangement of the one or more arrangements of switching ON and OFF of the at least ten switches between the input terminal and the output terminal to facilitate a 2:1 switched capacitor mode may include a first phase of operation, wherein the first switch, the third switch, the sixth switch, and the eighth switch are ON, and the remaining switches are OFF; and a second phase of operation, wherein the second switch, the fourth switch, the fifth switch, and the seventh switch are ON and the remaining switches are OFF.

In an aspect, a third arrangement of the one or more arrangements of switching ON and OFF of the at least ten switches between the input terminal and the output terminal to facilitate a 1:1 direct mode may include the first switch, the second switch, the fifth switch, and the sixth switch being ON and the remaining switches being OFF.

In an aspect, the present disclosure provides a multi-ratio switched capacitor power converter of a third typology. The converter may include an input power source a load, and a switching network. In an embodiment, the switching network may further include an input terminal connected to the input power source and an associated input capacitance, an output terminal connected to the load and an associated output capacitance to obtain a desired output voltage or output load current regulation; and at least nine switches, and one or more flying capacitors. The at least nine switches may be arranged in such a way that a first switch, a second switch, a third switch, and a fourth switch may be connected in series between the second terminal of ninth switch and a ground, and the series connection of the first switch, the second switch, the third switch, and the fourth switch may be connected in parallel with a series connection with a fifth switch, a sixth switch, a seventh switch, and an eighth switch and the series connection with the fifth switch, the sixth switch, the seventh switch, and the eighth switch may be connected in series between a ninth switch second terminal and the ground. Furthermore, one or more arrangements of switching ON and OFF of the at least nine switches between the input terminal and the output terminal causes one or more modes of power conversion configured based on a predetermined input voltage range, wherein the one or more modes of power conversion comprises a multi-ratio switched capacitor mode, and a 1:1 Direct mode.

In an aspect, the at least nine switches may be MOSFETs.

In an aspect, a first arrangement of the one or more arrangements of switching ON and OFF of the at least nine switches between the input terminal and the output terminal to facilitate a 3:1 switched capacitor mode may include a first phase of operation, wherein the first switch, the third switch, the sixth switch, the eighth switch, and the ninth switch are ON, and the remaining switches are in OFF; and a second phase of operation, wherein the first switch, the fourth switch, the fifth switch, and the seventh switch are ON and the remaining switches are OFF.

In an aspect, a second arrangement of the one or more arrangements of switching ON and OFF of the at least nine switches between the input terminal and the output terminal to facilitate a 2:1 switched capacitor mode may include a first phase of operation, wherein the first switch, the third switch, the sixth switch, the eighth switch, and the ninth switch are ON, and the remaining switches are OFF; and a second phase of operation, wherein the second switch, the fourth switch, the fifth switch, the seventh switch, and the ninth switch are ON and the remaining switches are OFF.

In an aspect, a third arrangement of the one or more arrangements of switching ON and OFF of the at least nine switches between the input terminal and the output terminal to facilitate a 1:1 direct mode may include the first switch, the second switch, the fifth switch, the sixth switch, and the ninth switch being ON and the remaining switches being OFF.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

The present disclosure relates to a power converter, and, in particular embodiments, to multi-ratio switched capacitor power converter for step-down power conversion operations and the like.

The present disclosure relates to multi-ratio switched capacitor converters. More particularly, it relates to a converter that addresses the problems faced by inductor-based and inductor-less power converters while supporting higher input voltages, high power levels, and charging the battery at higher charging currents.

Figure 1:
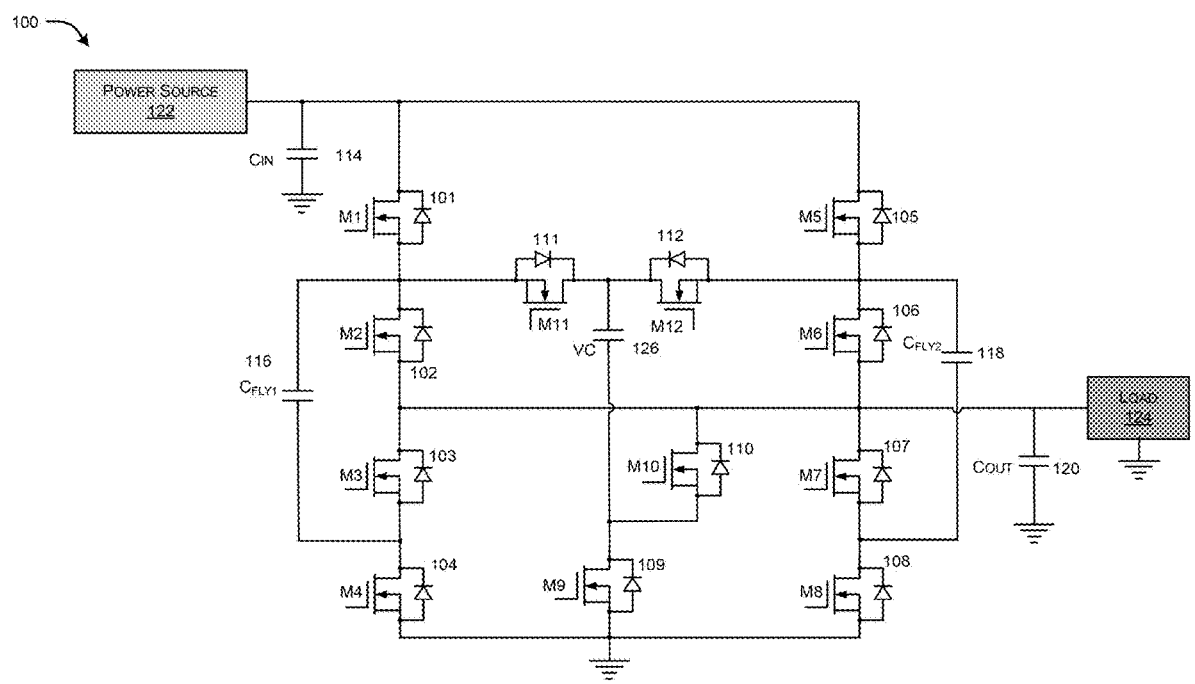
FIG. 1 illustrates an exemplary schematic diagram of a first topology of the proposed power converter, in accordance with an embodiment of the present disclosure.

FIG. 1 illustrates an exemplary schematic diagram of the proposed multi-ratio switched capacitor converter, in accordance with an embodiment of the present disclosure.

As illustrated, the proposed multi-ratio switched capacitor converter (100) (interchangeably referred to as the converter hereinafter) may be a multi-ratio switched capacitor power converter of a first typology. The multi-ratio switched capacitor converter (100) may include an input power source (122) and a load (124). The multi-ratio switched capacitor converter (100) comprises a switching network having an input terminal connected to the input power source (122) and an associated input capacitance (114), an output terminal connected to the load (124) and an associated output capacitance (120) to obtain a desired output voltage or output load current regulation. The switching network further includes at least twelve switches, one or more flying capacitors (116, 118). In an embodiment a first switch (101), a second switch (102), a third switch (103), and a fourth switch (104) of the at least twelve switches, are connected in series between the input terminal and a ground. The series connection of the first switch (101), the second switch (102), the third switch (103), and the fourth switch (104) of the at least twelve switches are connected in parallel with a series connection with a fifth switch (105), a sixth switch (106), a seventh switch (107), and an eighth switch (108) of the at least twelve switches. Further, the series connection with the fifth switch (105), the sixth switch (106), the seventh switch (107), and the eighth switch (108) are connected in series between the input terminal and the ground. Additionally, a ninth switch (109) may be configured in the switching network such that a first terminal of the ninth switch (109) is connected to a shared node of a first capacitor (126) and a second terminal of a tenth switch (110), and a second terminal of the ninth switch (109) is connected to the ground. A first terminal of the tenth switch (110) is connected to a shared node of the load (124) and the output capacitance (120), is connected to shared node of the second switch (102) and the third switch (103), is connected to shared node of the sixth switch (106) and the seventh switch (107). Further, the second terminal of the first switch (101), the first terminal of the second switch (102), and a second terminal of the fifth switch (105) are connected to first terminal of the sixth switch (106). Furthermore, the first capacitor (126) may be connected to a shared node of a second terminal of an eleventh switch (111) and a first terminal of a twelfth switch (112), and a first terminal of the eleventh switch (111) is connected to a shared node between the first switch (101) and the second switch (102) and wherein the second terminal of the twelfth switch (112) is connected to a shared node of the fifth switch (105) and the sixth switch (106). In an embodiment, one or more arrangements of switching ON and OFF of the at least twelve switches between the input terminal and the output terminal causes one or more modes of power conversion configured based on a predetermined input voltage range. The one or more modes of power conversion may include a multi-ratio switched capacitor mode, and a 1:1 direct mode.

In an embodiment, the at least twelve switches may be MOSFETs, but not limited to the like.

In an embodiment, a first arrangement of the one or more arrangements of switching ON and OFF of the at least twelve switches between the input terminal and the output terminal to facilitate a 4:1 switched capacitor mode. In an embodiment, the 4:1 switched capacitor mode may include one or more phases of operation. During a first phase of operation the first switch 101 (also referred to as M1 hereinafter) and the third switch (103) (also referred to as M3 hereinafter), the sixth switch (106) (also referred to as M6 hereinafter) and the eighth switch (108) (also referred to as M8 hereinafter) are ON state, and all other switches are in OFF state. The input output voltage equation is given by $$V_{IN} - V_{FLY1} - V_{OUT} = 0 \text{ and } V_{FLY2} = V_{OUT} \quad (1)$$

where, $V_{IN}$ is input voltage, $V_{OUT}$ is output voltage, $V_{FLY1}$ is voltage drop at $C_{FLY1}$ capacitor and $V_{FLY2}$ is voltage drop at $C_{FLY2}$ capacitor.

In an embodiment, during a second phase of operation the fourth switch (104) (also referred to as M4 hereinafter), the tenth switch (110) (also referred to as M10 hereinafter), the eleventh switch (111) (also referred to as M11 hereinafter), the sixth switch (106) (also referred to as M6 hereinafter) and the eighth switch (108) (also referred to as M8 hereinafter) are ON state, and all other switches are in OFF state. The voltage equation is given by $$V_{FLY1} - V_C - V_{OUT} = 0 \text{ and } V_{FLY2} = V_{OUT} \qquad (2)$$

Where, $V_C$ is voltage drop at the first capacitor (126) (also referred to as $V_C$ capacitor hereinafter), $V_{OUT}$ is output voltage, $V_{FLY1}$ is voltage drop at the first flying capacitor (116) (also referred to as $C_{FLY1}$ capacitor (116)) and $V_{FLY2}$ is voltage drop at the second flying capacitor (118) (also referred to as $C_{FLY2}$ capacitor (118)).

During third phase of operation the switches M1, M3, the seventh switch (107) (also referred to as M7 hereinafter), the ninth switch (109) (also referred to as M9), and the twelfth switch (112) (also referred to as M12 are ON state, and all other switches are in OFF state.

$$V_{IN} - V_{FLY1} - V_{OUT} = 0 \text{ and } V_C - V_{FLY2} - V_{OUT} = 0 \qquad (3)$$

Where, $V_{IN}$ is input voltage, $V_{OUT}$ is output voltage, $V_{FLY1}$ is voltage drop at the $C_{FLY1}$ capacitor (116) and $V_{FLY2}$ is voltage drop at the $C_{FLY2}$ capacitor (118) and, solving above Eq.1, Eq.2, and Eq.3

$$V_{FLY1} = 3V_{IN}/4 \text{ and } V_C = V_{IN}/2 \text{ and } V_{FLY2} = V_{IN}/4.$$

$$V_{out} = V_{in}/4$$

In an embodiment, a second arrangement of the one or more arrangements of switching ON and OFF of the at least twelve switches between the input terminal and the output terminal to facilitate a 3:1 switched capacitor mode. In an embodiment, the 3:1 switched mode may include one or more phases of operation. During a first phase of operation the switches M1, M3, M8, M10, and M12 are ON state, and all other switches are in OFF state. The input output voltage equation is given by $$V_{IN} - V_{FLY1} - V_{OUT} = 0 \text{ and } V_{FLY2} - V_C - V_{OUT} = 0 \qquad (4)$$

where, $V_{IN}$ is input voltage, $V_{OUT}$ is output voltage, $V_{FLY1}$ is voltage drop at $C_{FLY1}$ capacitor and $V_{FLY2}$ is voltage drop at $C_{FLY2}$ capacitor.

In an embodiment, during a second phase of operation the switches M1, M3, M6, M9, and M12 are ON state, and all other switches are in OFF state. The voltage equation is given by $$V_{IN} - V_{FLY1} - V_{OUT} = 0 \text{ and } V_C = V_{OUT} \qquad (5)$$

In an embodiment, during a third phase of operation the switches M4, M10, M11, M5, and M7 are ON state, and all other switches are in OFF state.

$$V_{FLY1} - V_C - V_{OUT} = 0 \text{ and } V_{IN} - V_{FLY2} - V_{OUT} = 0 \qquad (6)$$

After solving above Eq.4, Eq.5, and Eq.6

$$V_{FLY1} = 2V_{IN}/3 \text{ and } V_C = V_{IN}/3 \text{ and } V_{FLY2} = 2V_{IN}/3.$$

$$V_{out} = V_{in}/3$$

In an embodiment, a third arrangement of the one or more arrangements of switching ON and OFF of the at least twelve switches between the input terminal and the output terminal to facilitate a 2:1 switched capacitor mode. In an embodiment, the 2:1 switched mode may include one or more phases of operation. During a first phase of operation the switches M1, M3, M6, and M8 are ON state, and all other switches are in OFF state. The voltage equation is given by $$V_{IN} - V_{FLY1} - V_{OUT} = 0 \text{ and } V_{FLY2} - V_{OUT} = 0 \qquad (7)$$

In an embodiment, during a second phase of operation the switches M2, M4, M5, M7 are ON state, and all other switches are in OFF state.

$$V_{IN} - V_{FLY2} - V_{OUT} = 0 \text{ and } V_{FLY1} - V_{OUT} = 0 \qquad (8)$$

After solving above Eq.7, and Eq.8

$$V_{FLY1} = V_{IN}/2 \text{ and } V_{FLY2} = V_{IN}/2.$$

$$V_{out} = V_{in}/2$$

In an embodiment, a fourth arrangement of the one or more arrangements of switching ON and OFF of the at least twelve switches between the input terminal and the output terminal to facilitate a 1:1 direct mode. In an embodiment, the 1:1 direct mode may include a first phase of operation where the switches M1, M2, M5, and M6 are ON state, and all other switches are in OFF state $$V_{IN} = V_{OUT} \qquad (9)$$

Figure 2:
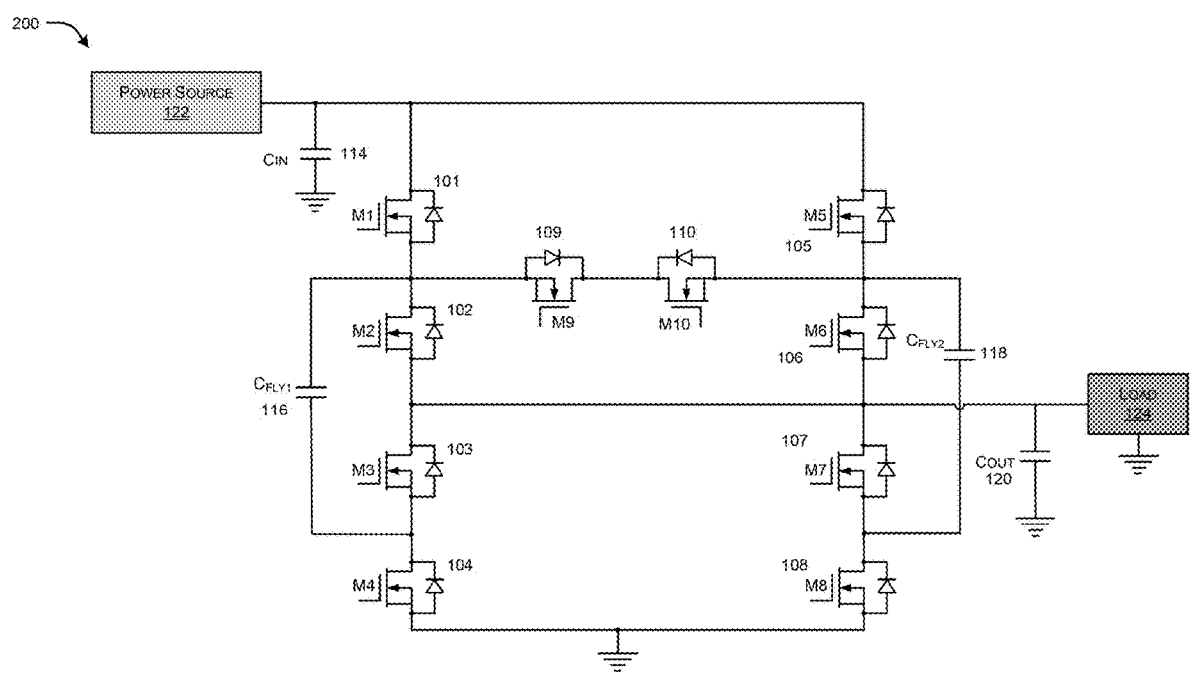
FIG. 2 illustrates an exemplary schematic diagram of a second topology of the proposed power converter, in accordance with an embodiment of the present disclosure.

FIG. 2 illustrates an exemplary schematic diagram of a second topology (200) of the proposed multi-ratio switched capacitor converter, in accordance with an embodiment of the present disclosure. As illustrated, the proposed multi-ratio switched capacitor converter (200) (interchangeably referred to as the converter hereinafter) may be a multi-ratio switched capacitor power converter of a second typology. The multi-ratio switched capacitor converter (200) may include an input power source (122) and a load (124). The multi-ratio switched capacitor converter (200) comprises a switching network having an input terminal connected to the input power source (122) and an associated input capacitance (114), an output terminal connected to the load (124) and an associated output capacitance (120) to obtain a desired output voltage or output load current regulation. The switching network further includes at least ten switches, and one or more flying capacitors (116, 118). In an embodiment, a first switch (101), a second switch (102), a third switch (103), and a fourth switch (104) of the at least ten switches, are connected in series between the input terminal and a ground. The series connection of the first switch (101), the second switch (102), the third switch (103), and the fourth switch (104) of the at least ten switches are connected in parallel with a series connection with a fifth switch (105), a sixth switch (106), a seventh switch (107), and an eighth switch (108) of the at least ten switches. Further, the series connection with the fifth switch (105), the sixth switch (106), the seventh switch (107), and the eighth switch (108) are connected in series between the input terminal and the ground. Additionally, a ninth switch (109) may be configured in the switching network such that a second terminal of the ninth switch (109) is connected to a shared node of the first switch (101) and the second switch (102), and a first terminal is connected to a first terminal of a tenth switch (110). The second terminal of the tenth switch (110) is connected to a shared node of the fifth switch (105) and the sixth switch (106). In an embodiment, one or more arrangements of switching ON and OFF of the at least ten switches between the input terminal and the output terminal causes one or more modes of power conversion configured based on a predetermined input voltage range. The one or more modes of power conversion may include a multi-ratio switched capacitor mode, and a 1:1 Direct mode.

In an embodiment, the at least ten switches may be MOSFETs, but not limited to the like.

In an embodiment, a first arrangement of the one or more arrangements of switching ON and OFF of the at least ten switches between the input terminal and the output terminal to facilitate a 3:1 switched capacitor mode. In an embodiment, the 3:1 switched capacitor mode may include one or more phases of operation. During a first phase of operation, the switches M1, M3, M6, and M8 are ON state, and all other switches are in OFF state $$V_{IN} - V_{FLY1} - V_{OUT} = 0 \text{ and } V_{FLY2} - V_{OUT} = 0 \quad (10)$$

In an embodiment, during a second phase of operation the switches M4, M9, M7, and M10 are ON state, and all other switches are in OFF state. The voltage equation is given by $$V_{FLY1} - V_{FLY2} - V_{OUT} = 0 \quad (11)$$

After solving above Eq.10, and Eq.11

$$V_{FLY2} = V_{IN}/3, V_{FLY1} = 2V_{IN}/3, \text{ and } V_{out} = V_{IN}/3$$

In an embodiment, a second arrangement of the one or more arrangements of switching ON and OFF of the at least ten switches between the input terminal and the output terminal to facilitate a 2:1 switched capacitor mode. In an embodiment, the 2:1 switched mode may include one or more phases of operation. During a first phase of operation the switches M1, M3, M6, and M8 are ON state, and all other switches are in OFF state. The voltage equations are given by $$V_{IN} - V_{FLY1} - V_{OUT} = 0 \text{ and } V_{FLY2} - V_{OUT} = 0 \quad (12)$$

In an embodiment, during second phase of operation the switches M2, M4, M5, and M7 are ON state, and all other switches are in OFF state. The voltage equations can be given by $$V_{IN} - V_{FLY2} - V_{OUT} = 0 \text{ and } V_{FLY1} - V_{OUT} = 0 \quad (13)$$

After solving above Eq.12, and Eq.13

$$V_{FLY1} = V_{IN}/2 \text{ and } V_{FLY2} = V_{IN}/2.$$

$$V_{out} = V_{in}/2$$

In an embodiment, a third arrangement of the one or more arrangements of switching ON and OFF of the at least ten switches between the input terminal and the output terminal to facilitate a 1:1 direct mode. In an embodiment, the 1:1 Direct mode may have a first phase of operation where the switches M1, M2, M5, and M6 are ON state, and all other switches are in OFF state $$V_{IN} = V_{out} \quad (14)$$

Figure 3:
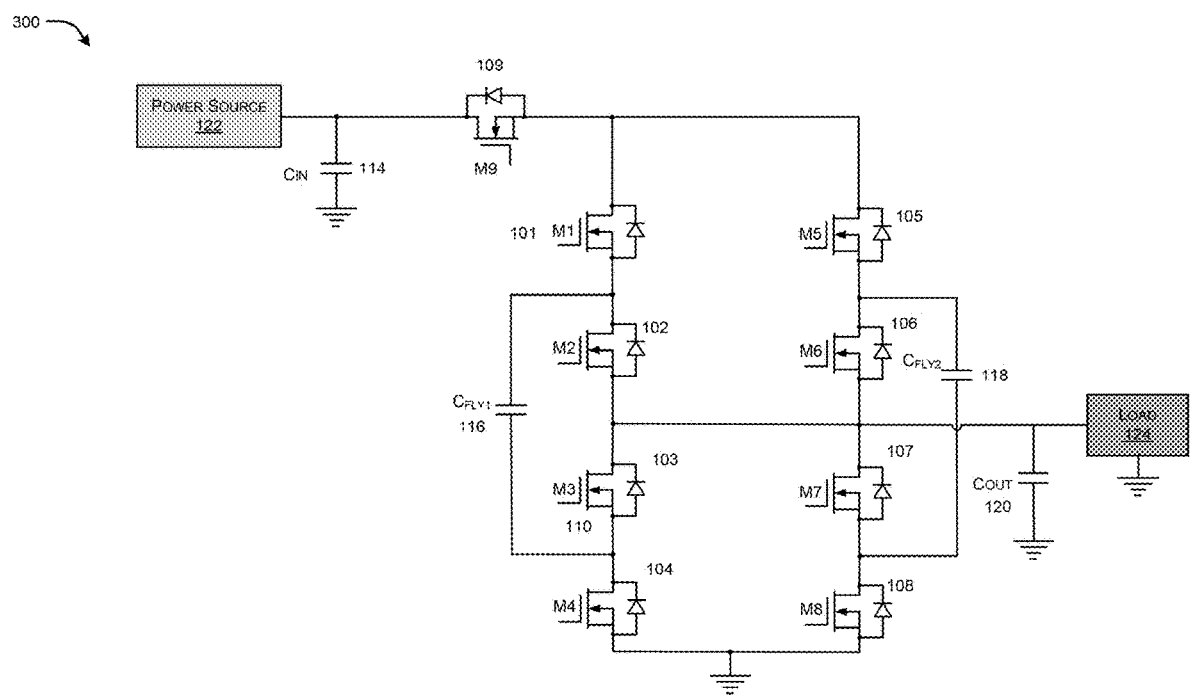
FIG. 3 illustrates an exemplary schematic diagram of a third topology of the proposed power converter, in accordance with an embodiment of the present disclosure.
Figure 4:
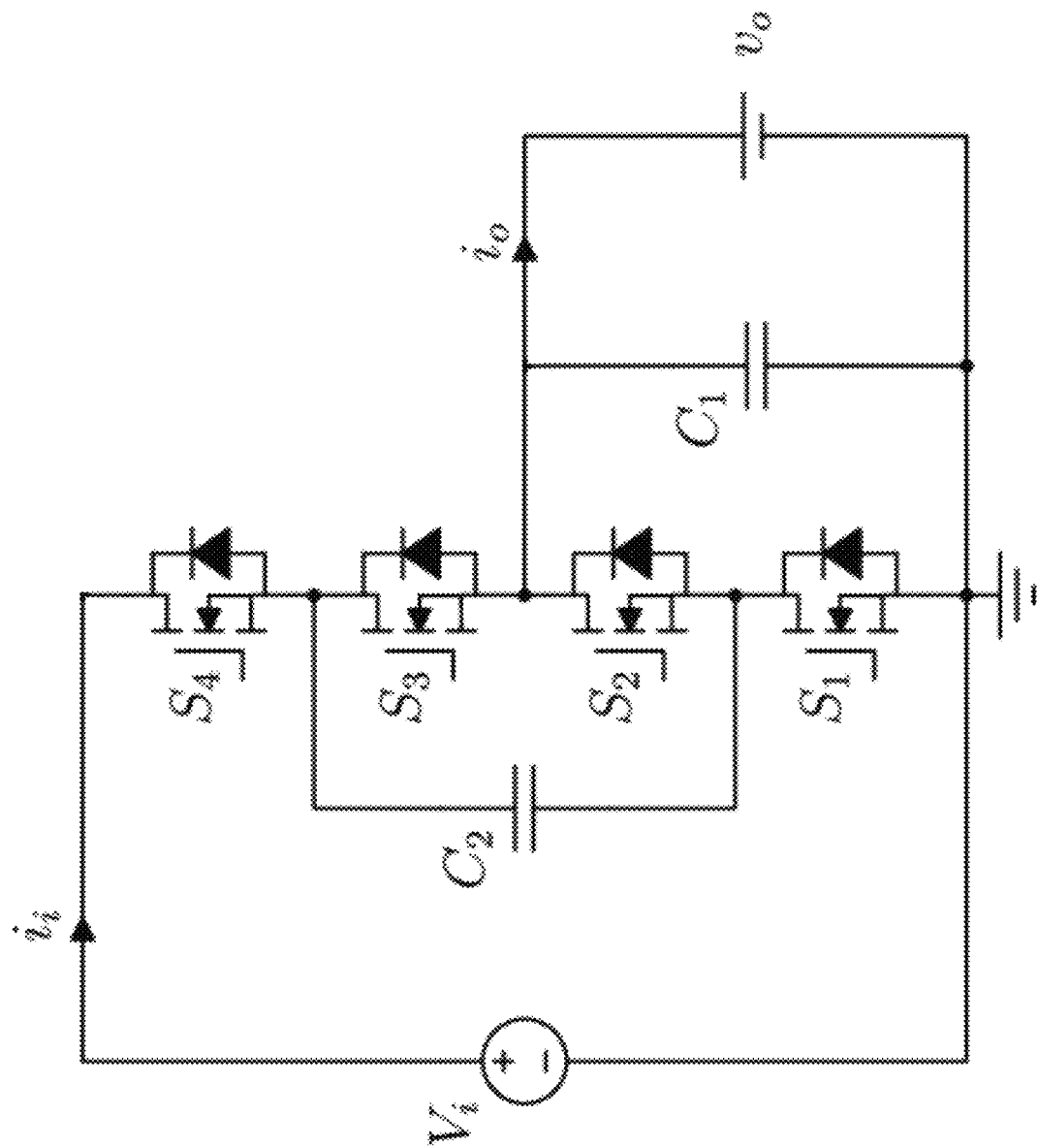
FIG. 4 illustrates an exemplary schematic diagram an existing (related art) 2:1 switched mode power converter, in accordance with an embodiment of the present disclosure.

FIG. 3 illustrates an exemplary schematic diagram of a third topology (300) of the proposed multi-ratio switched capacitor converter, in accordance with an embodiment of the present disclosure. As illustrated, the proposed multi-ratio switched capacitor converter (300) (interchangeably referred to as the converter hereinafter) may be a multi-ratio switched capacitor power converter of a second typology. The multi-ratio switched capacitor converter (300) may include an input power source (122), a load (124). The multi-ratio switched capacitor converter (300) comprises a switching network having an input terminal connected to the input power source (122) and an associated input capacitance (114), an output terminal connected to the load (124) and an associated output capacitance (120) to obtain a desired output voltage or output load current regulation. The switching network further includes at least nine switches, and one or more flying capacitors (116, 118). In an embodiment, a first switch (101), a second switch (102), a third switch (103), and a fourth switch (104) of the at least nine switches, are connected in series between the ninth switch (109) second terminal and a ground. The series connection of the first switch (101), the second switch (102), the third switch (103), and the fourth switch (104) of the at least nine switches are connected in parallel with a series connection with a fifth switch (105), a sixth switch (106), a seventh switch (107), and an eighth switch (108) of the at least nine switches. Further, the series connection with the fifth switch (105), the sixth switch (106), the seventh switch (107), and the eighth switch (108) are connected in series are between the ninth switch (109) second terminal and the ground.

Additionally, in an embodiment, one or more arrangements of switching ON and OFF of the at least nine switches between the input terminal and the output terminal causes one or more modes of power conversion configured based on a predetermined input voltage range. The one or more modes of power conversion may include a multi-ratio switched capacitor mode, and a 1:1 Direct mode.

In an embodiment, the at least nine switches may be MOSFETs, but not limited to the like.

In an embodiment, the 3:1 switched capacitor mode may include one or more phases of operation. During a first phase of operation, the switches M1, M3, M6, M8, and M9 are ON state, and all other switches are in OFF state $$V_{IN} - V_{FLY1} - V_{OUT} = 0 \text{ and } V_{FLY2} - V_{OUT} = 0 \quad (15)$$

In an embodiment, during a second phase of operation the switches M4, M1, M5, and M7 are ON state, and all other switches are in OFF state. The voltage equation is given by $$V_{FLY1} - V_{FLY2} - V_{OUT} = 0 \quad (16)$$

After solving above Eq.15, and Eq.16

$$V_{FLY2} = V_{IN}/3, V_{FLY1} = 2V_{IN}/3, \text{ and } V_{out} = V_{IN}/3$$

In an embodiment, a second arrangement of the one or more arrangements of switching ON and OFF of the at least nine switches between the input terminal and the output terminal to facilitate a 2:1 switched capacitor mode. In an embodiment, the 2:1 switched mode may include one or more phases of operation. During a first phase of operation the switches M1, M3, M6, M8, and M9 are ON state, and all other switches are in OFF state. The voltage equations are given by $$V_{IN} - V_{FLY1} - V_{OUT} = 0 \text{ and } V_{FLY2} - V_{OUT} = 0 \quad (17)$$

In an embodiment, during second phase of operation the switches M2, M4, M5, M7, and M9 are ON state, and all other switches are in OFF state. The voltage equations can be given by $$V_{IN} - V_{FLY2} - V_{OUT} = 0 \text{ and } V_{FLY1} - V_{OUT} = 0 \quad (18)$$

After solving above Eq.17, and Eq.18

$$V_{FLY1} = V_{IN}/2 \text{ and } V_{FLY2} = V_{IN}/2.$$

$$V_{out} = V_{in}/2$$

In an embodiment, a third arrangement of the one or more arrangements of switching ON and OFF of the at least nine switches between the input terminal and the output terminal to facilitate a 1:1 direct mode. In an embodiment, the 1:1 Direct mode may have a first phase of operation where the switches M1, M2, M5, M6, and M9 are ON state, and all other switches are in OFF state $$V_{IN} = V_{out} \quad (19)$$

In an embodiment, there can be a plurality of modes of operation for a multi ratio or n:1 switched capacitor mode of the proposed power converter.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides for a power conversion system to obtain a desired output voltage or output load current regulation.

The present disclosure provides for a power conversion system that supports different modes of operations.

The present disclosure provides for a power conversion system that can support a load with a single or multi cell battery.

We claim:

1. A multi-ratio switched capacitor power converter, the converter comprising:
   an input power source;
   a load; and
   a switching network, said switching network comprising:
   an input terminal connected to the input power source and an associated input capacitance, an output terminal connected to the load and an output capacitance to obtain a desired output voltage or output load current regulation;
   at least twelve switches; and
   one or more flying capacitors,
   wherein a first switch, a second switch, a third switch, and a fourth switch of the at least twelve switches, are connected in series between the input terminal and a ground, wherein the series connection of the first switch, the second switch, the third switch, and the fourth switch of the at least twelve switches are connected in parallel with a series connection with a fifth switch, a sixth switch, a seventh switch, and an eighth switch of the at least twelve switches, wherein the series connection with the fifth switch, the sixth switch, the seventh switch, and the eighth switch are connected in series between the input terminal and the ground,
   wherein a ninth switch is configured in the switching network such that a first terminal of the ninth switch is connected to a shared node of a bottom plate of a first capacitor and a second terminal of a tenth switch, wherein a second terminal of a ninth switch is connected to the ground, wherein a first terminal of the tenth switch is connected to a shared node of the load and the output capacitance, and the second terminal of the tenth switch is connected to the bottom plate of the first capacitor,
   wherein a top plate of the first capacitor is connected to a shared node of a first terminal of an eleventh switch and a first terminal of a twelfth switch, wherein a second terminal of the eleventh switch is connected to a shared node between the first and the second switch, and wherein the second terminal of the twelfth switch is connected to a shared node of the fifth and the sixth switch, and
   wherein one or more arrangements of switching ON and OFF of the at least twelve switches between the input terminal and the output terminal causes one or more modes of power conversion configured based on a predetermined input voltage range, wherein the one or more modes of power conversion comprises a multi-ratio switched capacitor mode, and a 1:1 direct mode.

2. The converter as claimed in claim 1, wherein the at least twelve switches are MOSFETs.

3. The converter as claimed in claim 1, wherein a first arrangement of the one or more arrangements of switching ON and OFF of the at least twelve switches between the input terminal and the output terminal to facilitate a 4:1 switched capacitor mode comprises:
   a first phase of operation, wherein the first switch, the third switch, the sixth switch, and the eighth switch are ON, and remaining switches are OFF;
   a second phase of operation, wherein the fourth switch, the tenth switch, the eleventh switch, the sixth switch, and the eighth switch are ON and remaining switches are OFF; and
   a third phase of operation, wherein the first switch, the third switch, the seventh switch, the ninth switch, and the twelfth switch are ON and remaining switches are OFF.

4. The converter as claimed in claim 1, wherein a second arrangement of the one or more arrangements of switching ON and OFF of the at least twelve switches between the input terminal and the output terminal to facilitate a 3:1 switched capacitor mode comprises:
   a first phase of operation, wherein the first switch, the third switch, the eighth switch, the tenth switch, and the twelfth switch are ON, and remaining switches are OFF;
   a second phase of operation, wherein the first switch, the third switch, the sixth switch, the ninth switch, and the twelfth switch are ON and remaining switches are OFF; and
   a third phase of operation, wherein the fourth switch, the tenth switch, the eleventh switch, the fifth switch, and the seventh switch are ON and remaining switches are OFF.

5. The converter as claimed in claim 1, wherein a third arrangement of the one or more arrangements of switching ON and OFF of the at least twelve switches between the input terminal and the output terminal to facilitate a 2:1 switched capacitor mode comprises:
   a first phase of operation, wherein the first switch, the third switch, the sixth switch, and the eighth switch are ON, and remaining switches are in OFF; and
   a second phase of operation, wherein the second switch, the fourth switch, the fifth switch, and the seventh switch are ON and remaining switches are OFF.

6. The converter as claimed in claim 1, wherein a fourth arrangement of the one or more arrangements of switching ON and OFF of the at least twelve switches between the input terminal and the output terminal to facilitate a 1:1 direct mode comprises:
   the first switch, the second switch, the fifth switch, and the sixth switch being ON and remaining switches being OFF.

7. A multi-ratio switched capacitor power converter, the converter comprising:
   an input power source;
   a load; and
   a switching network, said switching network comprising:
   an input terminal connected to the input power source and an associated input capacitance, an output terminal connected to the load and an associated output capacitance to obtain a desired output voltage or output load current regulation;

at least ten switches; and
one or more flying capacitors,
wherein a first switch, a second switch, a third switch, and a fourth switch of the at least ten switches, are connected in series between the input terminal and a ground, wherein the series connection of the first switch, the second switch, the third switch, and the fourth switch of the at least ten switches are connected in parallel with a series connection with a fifth switch, a sixth switch, a seventh switch, and an eighth switch of the at least ten switches, wherein the series connection with the fifth switch, the sixth switch, the seventh switch, and the eighth switch are connected in series between the input terminal and the ground,
wherein a ninth switch configured in the switching network such that a second terminal of the ninth switch is directly connected to a shared node of the first switch and the second switch, wherein a first terminal of the ninth switch is connected to a first terminal of a tenth switch, wherein a second terminal of the tenth switch is directly connected to a shared node of the fifth switch and the sixth switch, and
wherein one or more arrangements of switching ON and OFF of the at least ten switches between the input terminal and the output terminal causes one or more modes of power conversion configured based on a predetermined input voltage range, wherein the one or more modes of power conversion comprises a multi-ratio switched capacitor mode, and a 1:1 direct mode.

8. The converter as claimed in claim 7, wherein the at least ten switches are MOSFETs.

9. The converter as claimed in claim 7, wherein a first arrangement of the one or more arrangements of switching ON and OFF of the at least ten switches between the input terminal and the output terminal to facilitate a 3:1 switched capacitor mode comprises:
a first phase of operation, wherein the first switch, the third switch, the sixth switch, and the eighth switch are ON, and remaining switches are in OFF; and
a second phase of operation, wherein the fourth switch, the ninth switch, the seventh switch, and the tenth switch are ON and remaining switches are OFF.

10. The converter as claimed in claim 7, wherein a second arrangement of the one or more arrangements of switching ON and OFF of the at least ten switches between the input terminal and the output terminal to facilitate a 2:1 switched capacitor mode comprises:
a first phase of operation, wherein the first switch, the third switch, the sixth switch, and the eighth switch are ON, and remaining switches are OFF; and
a second phase of operation, wherein the second switch, the fourth switch, the fifth switch, and the seventh switch are ON and remaining switches are OFF.

11. The converter as claimed in claim 7, wherein a third arrangement of the one or more arrangements of switching ON and OFF of the at least ten switches between the input terminal and the output terminal to facilitate a 1:1 direct mode comprises:
the first switch, the second switch, the fifth switch, and the sixth switch being ON and remaining switches being OFF.

12. A multi-ratio switched capacitor power converter, the converter comprising:
an input power source;
a load; and
a switching network, said switching network comprising:
an input terminal connected to the input power source and an associated input capacitance, an output terminal connected to the load and an associated output capacitance to obtain a desired output voltage or output load current regulation;
at least nine switches; and
one or more flying capacitors,
wherein a first switch, a second switch, a third switch, and a fourth switch of the at least nine switches, are connected in series between a first terminal of a ninth switch and a ground, wherein the series connection of the first switch, the second switch, the third switch, and the fourth switch of the at least nine switches are connected in parallel with a series connection with a fifth switch, a sixth switch, a seventh switch, and an eighth switch of the at least nine switches, wherein the series connection with the fifth switch, the sixth switch, the seventh switch, and the eighth switch are connected in series between a first terminal of a ninth switch and the ground, wherein a second terminal of the ninth switch is connected to an input power source,
wherein one or more arrangements of switching ON and OFF of the at least nine switches between the input terminal and the output terminal causes one or more modes of power conversion configured based on a predetermined input voltage range, wherein the one or more modes of power conversion comprises a multi-ratio switched capacitor mode, and a 1:1 direct mode, and
wherein a first arrangement of the one or more arrangements of switching ON and OFF of the at least nine switches between the input terminal and the output terminal to facilitate a 3:1 switched capacitor mode comprises:
a first phase of operation, wherein the first switch, the third switch, the sixth switch, the eighth switch, and the ninth switch are ON, and remaining switches are in OFF; and
a second phase of operation, wherein the first switch, the fourth switch, the fifth switch, and the seventh switch are ON and remaining switches are OFF.

13. The converter as claimed in claim 12, wherein the at least nine switches are MOSFETs.

14. The converter as claimed in claim 12, wherein a second arrangement of the one or more arrangements of switching ON and OFF of the at least nine switches between the input terminal and the output terminal to facilitate a 2:1 switched capacitor mode comprises:
a first phase of operation, wherein the first switch, the third switch, the sixth switch, the eighth switch, and the ninth switch are ON, and remaining switches are OFF; and
a second phase of operation, wherein the second switch, the fourth switch, the fifth switch, the seventh switch, and the ninth switch are ON and remaining switches are OFF.

15. The converter as claimed in claim 12, wherein a third arrangement of the one or more arrangements of switching ON and OFF of the at least nine switches between the input terminal and the output terminal to facilitate a 1:1 direct mode comprises:
the first switch, the second switch, the fifth switch, the sixth switch, and the ninth switch being ON and remaining switches being OFF.

* * * * *